June 22, 1926. 1,589,371
T. V. COOPER
RIDGE CUTTING ATTACHMENT FOR STALK CHOPPERS
Filed August 14, 1923   2 Sheets-Sheet 2
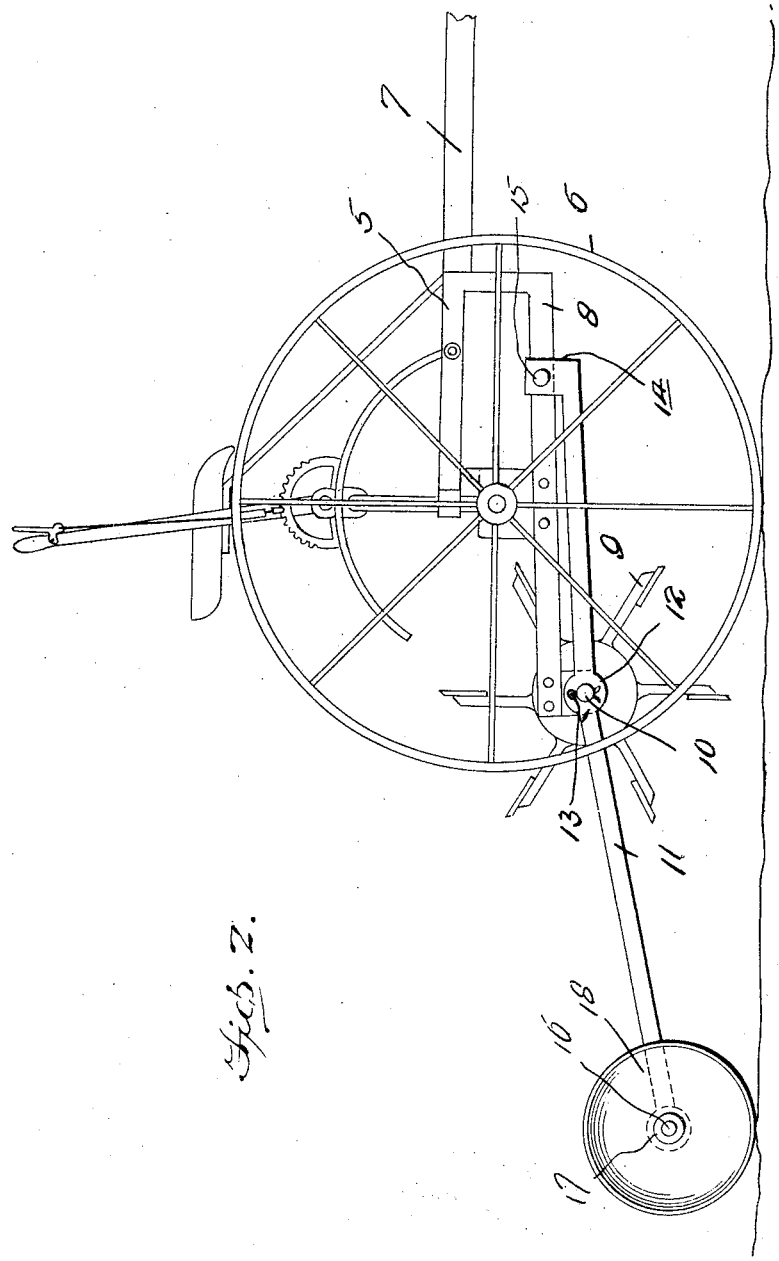

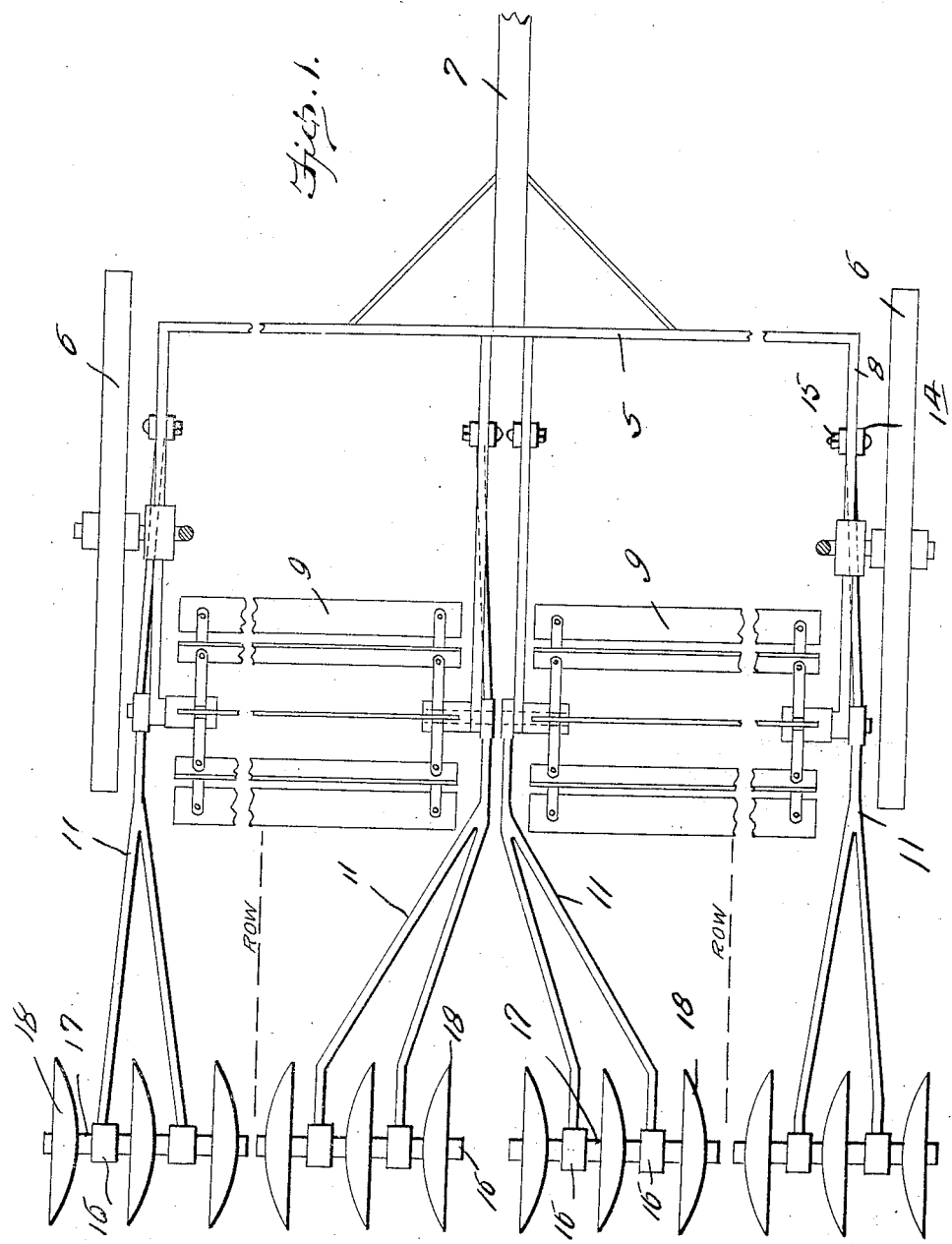

Patented June 22, 1926.

1,589,371

UNITED STATES PATENT OFFICE.

TEARENCE VIRGIL COOPER, OF GIDEON, MISSOURI.

RIDGE-CUTTING ATTACHMENT FOR STALK CHOPPERS.

Application filed August 14, 1923. Serial No. 657,351.

This invention relates to attachments for stalk choppers, and has particular reference to the provision of a simple and efficient means for cutting down ridges in the soil during the stalk chopping operation.

The primary object of the invention is to provide a device of the above kind which embodies extreme simplicity and durability of construction as well as efficient operation so that the stalk chopping drums or cylinders will operate in advance of the ridge cutters and two closely related operations may be accomplished by the same machine.

Another object is to provide means readily attachable to the stalk chopping drum supporting arms of a stalk chopping machine for carrying a plurality of ridge cutting discs positioned behind the stalk chopping drums, whereby the device may be readily applied to existing types of stalk choppers with a minimum expenditure of time and labor.

With the above general objects in view, and others that will become apparent as the nature of the invention is better understod, the same consists in the novel form, combination and arrangement of parts hereinafter more fully described, shown in the accompanying drawings, and claimed.

In the drawings, wherein like reference characters indicate corresponding parts throughout the several views, Figure 1 is a top plan view, partly broken away, showing one form of the present invention applied to a conventional form of double row stalk chopper, and Figure 2 is a side elevational view of the device shown in Figure 1.

Referring more in detail to the drawings, a conventional form of stalk chopper of the double row type is shown embodying a frame 5 suitably mounted upon supporting wheels 6 and having a draft tongue 7, the frame 5 being provided with an under frame consisting of longitudinal rearwardly extending parallel arms 8 between which are positioned the stalk cutting cylinders or drums 9, the shafts 10 of said drums being suitably journaled in bearings carried by the rear ends of said arms 8.

The present invention embodies a pair of arms or drag bars 11 for each drum 9 having eyed intermediate portions 12 secured upon the projecting ends of the drum shafts by means of the usual cotter pins 13 or the like and having their forward ends terminating in upwardly directed bifurcated portions 14 adapted to straddle the arms 8 and provided with clamping screws 15 by which these ends of the arms 11 are effectively secured to the arms 8.

The rear ends of the drag bars 11 are bifurcated so as to provide spaced bearings at the rear end of each drag bar which carry shafts 17 upon which the discs 18 are mounted, the discs of one drag bar being reversely disposed with respect to the disc of the other drag bar in each set.

It will of course be understood that the invention can be applied to a single row stalk chopper by simply employing two of the drag bars 11, one of the same being operatively connected to the stalk chopping machine at each side of the drum thereof. The mounting of the discs 18 may be of any preferred or well known form wherein the outer discs are removable when desired to employ only two discs on each drag bar, and as shown in Figure 2, the rear end portions of the drag bars are rearwardly inclined so as to bring the discs in proper relation to the soil.

In stalk choppers of the form shown, means is usually provided for raising and lowering the chopping drum, and when this is the case, it will be seen that the discs of the ridge cutter will be similarly raised by reason of the attachment of the drag bars 11 to the arms 8 in the manner shown and described above.

From the foregoing description, it will be seen that I have provided a simple means for attaching a gang of discs to the supporting arms of a stalk chopper drum so that the invention may be readily applied to or removed from conventional types of machines with little expenditure of time and labor, and by means of which the ridges in the soil may be effectively cut as the stalk chopping operation proceeds in advance thereof.

Minor changes may be made without departing from the spirit and scope of the invention as claimed.

What I claim as new is:

In a ridge cutting attachment for a conventional stalk chopper, wherein the latter embodies, among other parts, a frame, rotary choppers, and supporting shafts for the choppers extending beyond the ends of the choppers, said attachment comprising a bar provided at its inner end with a clamp adapted to be detachably connected with one of the arms of the frame of the chopper, said bar being provided intermediate its ends with an enlarged apertured portion forming a bearing for reception of the extended shaft ends of one of the rotary choppers, said bar being provided at its rear end with diverging spaced extensions provided at their extremities with bearings, a shaft journaled for rotation in said bearings and cutting discs carried by said shaft.

In testimony whereof I affix my signature.

TEARENCE VIRGIL COOPER.